United States Patent [19]
Rolin et al.

[11] Patent Number: 4,509,351
[45] Date of Patent: Apr. 9, 1985

[54] SPINNING LATHE

[75] Inventors: Guy Rolin, Chelles, France; Jacques Rabizzoni, late of Lesigny, France, by Yannick Rabizzoni neé Volle, administratrix

[73] Assignee: Etablissements Rondolotti, Vincennes, France

[21] Appl. No.: 342,805

[22] Filed: Jan. 26, 1982

[30] Foreign Application Priority Data

Jan. 26, 1981 [FR] France ................................ 81 01383

[51] Int. Cl.³ ...................... B21B 37/08; B21D 22/16
[52] U.S. Cl. .......................................... 72/19; 72/83; 72/85
[58] Field of Search ...................... 72/19–21, 72/81, 82, 83, 84, 102, 7, 85; 73/862.06, 862.54

[56] References Cited

U.S. PATENT DOCUMENTS

| | | | |
|---|---|---|---|
| 3,145,756 | 8/1964 | Hill | 72/7 |
| 3,282,078 | 11/1966 | Kaesemeyer | 72/82 |
| 3,564,883 | 2/1971 | Koors et al. | 72/19 |
| 3,596,506 | 8/1971 | Wilson, Jr. | 73/862.06 |
| 3,602,090 | 8/1971 | Whetham | 73/862.06 |
| 3,726,117 | 4/1973 | Braun | 72/7 |
| 3,826,131 | 7/1974 | Pritschow | 73/862.06 |

FOREIGN PATENT DOCUMENTS

| | | | |
|---|---|---|---|
| 2457504 | 6/1976 | Fed. Rep. of Germany | 72/81 |
| 18586 | 2/1977 | Japan | 72/19 |
| 716970 | 10/1954 | United Kingdom | 73/862.02 |
| 2075389 | 11/1981 | United Kingdom | 72/82 |
| 254164 | 10/1969 | U.S.S.R. | 73/862.02 |
| 654318 | 3/1979 | U.S.S.R. | 72/19 |

*Primary Examiner*—Lowell A. Larson
*Attorney, Agent, or Firm*—Cushman, Darby & Cushman

[57] ABSTRACT

In this spinning lathe, the force exerted by a wheel on the workpiece is constantly supervised by one or more force sensors which furnish an instantaneous force signal to a servo-loop which controls the movement of the wheel in a direction transverse to the axis of rotation of the lathe. The set signal of the servo-loop is generated by a generator which may be actuated manually or operate automatically in accordance with a program. The servo-loop controls the force to be exerted by the wheel by means of a cylinder device supplied with fluid through a controlled valve.

9 Claims, 5 Drawing Figures

SPINNING LATHE

DESCRIPTION

The present invention relates to spinning or fluoturning whereby objects of revolution are produced by placing a metal blank against a form which is rotated and has the inner profile of the object to be manufactured.

This technique is carried out on lathes comprising a forming tool which is mounted on a carriage movable in two perpendicular directions and which is urged against the metal of the blank and gradually produces the correct shape of the object usually in a plurality of passes. The longitudinal motion of the carriage, ie. that which is generally parallel to the mean generatrix of the rotary chuck, is generally produced by a screw-and-nut hydraulic motor or the like which drives a double slide on which the wheel support slide is mounted. The latter moves in a direction transverse to the mean generatrix of the rotary chuck and the movement is generally produced by a hydraulic shifting device or the like.

In a first type of prior lathes, this hydraulic shifting device producing the transverse motion is regulated as concerns pressure by means of a discharge valve connected to the thrust orifice of the hydraulic device Such a lathe has drawbacks which are related to the fact that it is not possible to regulate the thrust of the wheel on the metal below a certain limit defined by the lower value of the range of calibration of the discharge valve. Further, account must be taken of friction of the wheel holding slide and of the shifting device therefor. In such a lathe, it is difficult consequently to work on soft metals, carry out finishing operations on these metals, or work on thin workpieces, which are operations in respect of which the thrust must of necessity be very low. Of course it would be possible to modify the range of the pressure regulation by changing the discharge valve or the calibration spring of the latter, but it will be understood that such a procedure does not contribute to a convenient operation of the lathe.

Another type of lathe employing a copying device, such as that disclosed French Pat. No. 2,417,128, provides an improvement in the lathe described hereinbefore owing to the fact that the shifting device which governs the thrust exerted by the wheel is controlled by a valve which is controlled by the profile of a pattern so as to define the path of the wheel in the course of the plurality of successive passes required to obtain the object.

More precisely, the pattern or the master is explored by a follower which actuates a movement sensor whose output signal is sent to a first input of a differential amplifier which forms the central element of the servo-loop. The second input of the amplifier receives a set signal produced by a generator of switchable set signals each of which corresponds to one pass or a series of passes of the wheel. The amplifier sends a control signal to the controlled valve when it is put in a state of disequilibrium by the variation in the signal coming from the sensor.

Although this control device operates satisfactorily, it is however necessary in respect of finishing passes with soft metal, to provide an elastically yieldable suspension of the wheel on its carriage. Further, the mechanical patterns or masters must be manufactured with high precision for all the objects to be manufactured and must be mounted on the machine, the use of which is consequently lacking in flexibility.

The patent DE No. 2,457,504 discloses a machine for manufacturing cylindrical tubes having a circular cross-sectional shape from blanks of relatively large thickness. For this purpose, the blank mounted on a chuck which is movable in the axial direction of the blank is shifted in this direction relative to a fixed wheel forming the tool, this wheel, in penetrating the thickness of the blank, deforming the latter and producing its elongation.

The chuck supporting the blank is advanced by a shifting device whose force, ie. whose actuating pressure, is under the control of a reference pressure furnished by a differential sensor. The error signal produced in this sensor is applied to an amplifier which regulates either the pressure of the shifting device or the speed of rotation of the chuck. Thus an attempt is made to achieve a compensation for variations in local variations in hardness which might exist in the blanks.

However, this compensation is only partially achieved since the measuring capsule of the differential sensor measures the pressure in the chamber of the shifting device and detects not only the force exerted by the tool but also all the secondary forces due to friction and other disturbing phenomena the magnitude of which are far from being negligible bearing in mind the considerable forces produced by the fluoturning operation. These disturbing forces are not constant and moreover have a large transverse component which is transferred to the bearings in which the chuck moves.

It is therefore clear that it is not possible to achieve by means of the teaching of patent DE No. 2,457 504 the object of the present invention, namely to provide a spinning/fluoturning machine which may be operated with high precision both for working passes and for finishing passes, with no complicated handling and which is particularly easily adaptable for a fully automatic control for the mass-production of workpieces.

The invention therefore provides a spinning/-fluoturning machine comprising a device for rotating a chuck about a horizontal axis, said chuck having the inner contour of the workpiece to be obtained and being adapted to cooperate with a working tool which is mounted on a carriage capable of effecting two movements which are perpendicular to each other, at least the movement of the tool which is roughly transverse to the mean generatrix of the chuck being controlled by a servo-loop which is connected to the control element of the driving device which produces said transverse movement, said servo-loop comprising as a real signal generator at least a sensor which senses the force exerted by the tool on the workpiece in the course of the forming thereof and a generator of a set valve representing the force to be exerted by the tool, wherein said sensor is mounted in the support for the tool and is sensitive to the deformations of said support due to the force exerted by the tool and said set force generator comprises means for dynamically varying the set valve in the course of each working pass of the tool.

Owing to these features, the servo-loop receives, as the real signal, only the force really exerted on the object in the course of the forming, since all the disturbing forces produced in the mechanical arrangement connecting the actuating device to the tool holder are not taken into account. There is consequently a very high precision in the control. Further, as the set signal is variable in a dynamic manner, it becomes possible to regulate with this very high precision the force exerted by the tool within a range ranging from a zero value to a maximum value of the force exerted by the tool capable of being produced by the machine, the servo-loop tending at each instant to cancel out the error signal resulting from the comparison of the set signal with the real signal irrespective of the absolute value of the chosen force determined by the set force generator. Thus, the regulating range may range from 0 to 2 000 kg for example.

By means of the invention it is also possible, with a high flexibility of operation, to copy series of identical workpieces by passing the machine first of all through a manual stage termed the "apprenticeship" stage in the course of which the set signal generator is controlled by the operator during which the set signals are stored, after which the machine is itself capable of restoring these values in the course of a copying stage during which the workpieces are massproduced.

The invention will be described hereinafter in more detail with reference to the drawings which illustrate only an embodiment and in which.

Figure 1:
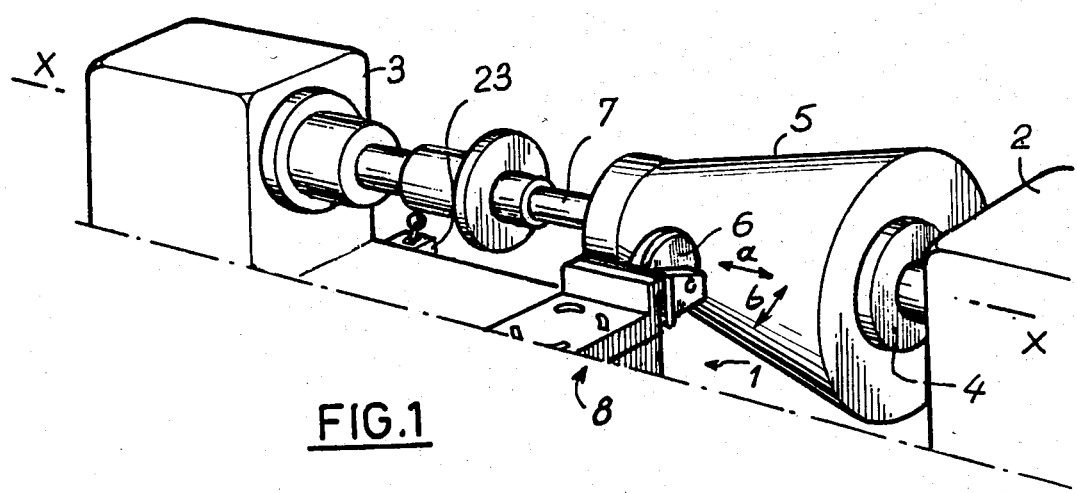
FIG. 1 is a diagrammatic perspective view of a spinning lathe according to the invention viewed from the rear end thereof.

FIG. 1 shows a spinning lathe which has an axis X—X and comprises a bed 1, a headstock 2 and a tailstock 3. The chuck 4 of the headstock carries a form 5 which is frustoconical in the illustrated embodiment, it being understood that any other form may be employed, depending on the workpieces to be manufactured. A tool 6 formed by a roller or wheel cooperates with the form 5 so as to urge gradually the material of a metal blank (not shown) against the form 5, the blank being gripped between the centre of the tailstock 3 and the corresponding end face of the form 5.

The roller 6 may move in two directions a and b, which are perpendicular to each other in the illustrated embodiment, the direction a being roughly parallel to the mean generatrix of the form 5.

Figure 3:
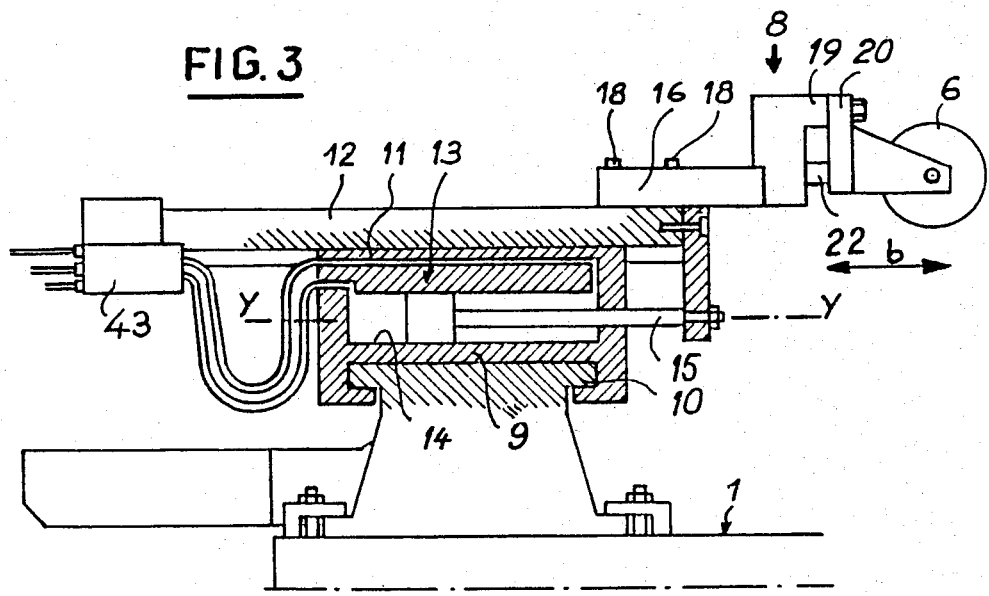
FIG. 3 is a side elevation view of this support and this wheel.

For this purpose, the roller is rotatively mounted on a support 8 carried by a carriage 9 which is slidably mounted on a slide 10 rigid with the bed 1 of the lathe (FIG. 3). The carriage 9 constitutes a slide 11 on which a second carriage is movable, this second carriage moving the tool in the direction b.

The movements of the carriage 9 in the direction a are controlled by a shifting device (not shown), and the movements of the carriage 12 are controlled by a shifting device 13 which is shown to comprise a cylinder 14 which has an axis Y—Y extending in a direction parallel to the direction b and receives a piston to which is connected a rod 15 rigid with the carriage 12 close to the support 8.

Figure 2:
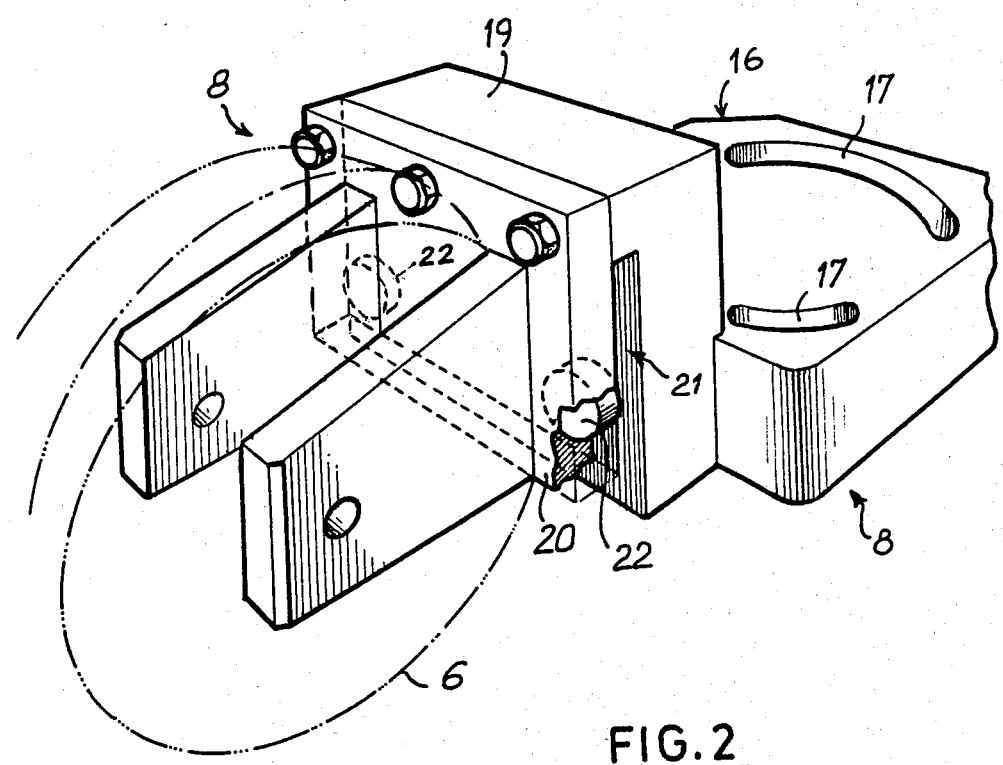
FIG. 2 is a perspective view to an enlarged scale of a wheel support for the lathe shown in FIG. 1 and arranged in accordance with the invention.

The construction of the support 8 is clearly shown in FIG. 2. It comprises a fixing plate 16 provided with arcuate slots 17 through which fixing screws 18 pass (these screws are not shown in FIG. 2). This arrangement allows the angular position of the roller 6 relative to the axis X—X of the lathe to be adjusted.

A post 19 is rigid with the fixing plate 16 and carries a yoke 20 which is rigid with the post only by the upper edge portion thereof so that there is defined therebetween and the post a space 21 in which are disposed two force sensors 22 which are placed at the same height close to the vertical edges of the web of the yoke 20. The roller 6 is rotatively mounted in the yoke 20.

Figure 4:
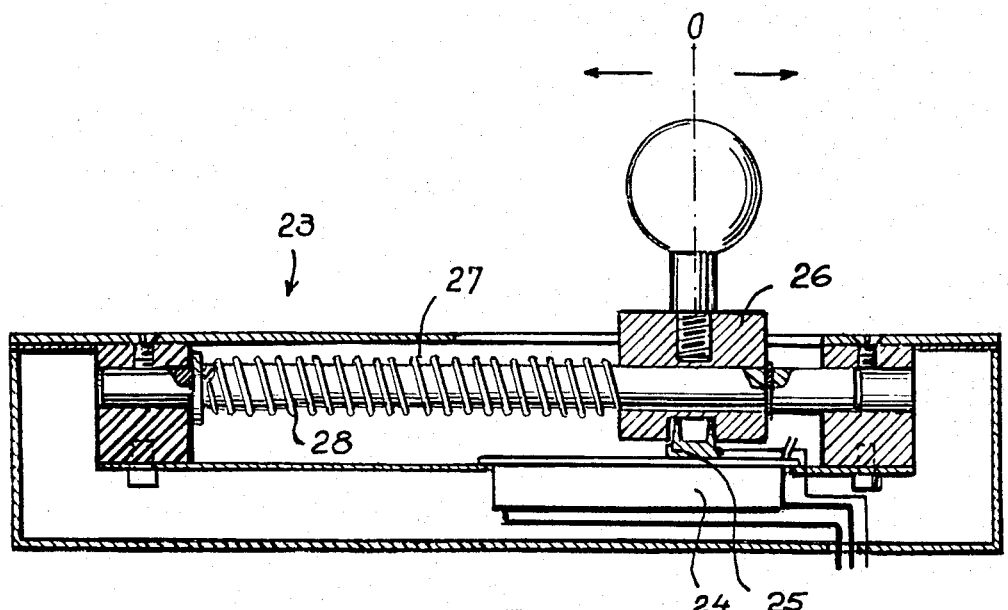
FIG. 4 is an elevational view and a sectional view of a manual control box which may be employed with the lathe according to the invention.

FIG. 4 shows an embodiment of a set value generator 23 for the manual operation of the lathe. This generator comprises a case in which is disposed a potentiometer 24. The slider 25 of the lathe is rigid with a slide 26 which has a shifting knob and is mounted on a rod 27 which is slidable in the case. From its zero position (the position shown in FIG. 4), the slide 26 may be moved toward the position of maximum force in opposition to the action of a coil spring 28 surrounding the rod 27, this spring giving the operator a sensation of an increase in the force on the roller as he shifts the slider toward the maximum position (to the left in FIG. 4). The slider 25 may also be shifted to the rear so as to move the roller support carriage 12 rearwardly, the rod 27 being shifted to the right as viewed in FIG. 4 in sliding in the supports therefor. It must be understood that the generator 23 just described and illustrated is only an example. The same function may be performed by any other suitable like control means.

The set value generator 23 is associated with an electronic storage and control circuit 29 (FIG. 5) which may replace it when the lathe is set to operate in the automatic mode.

Figure 5:
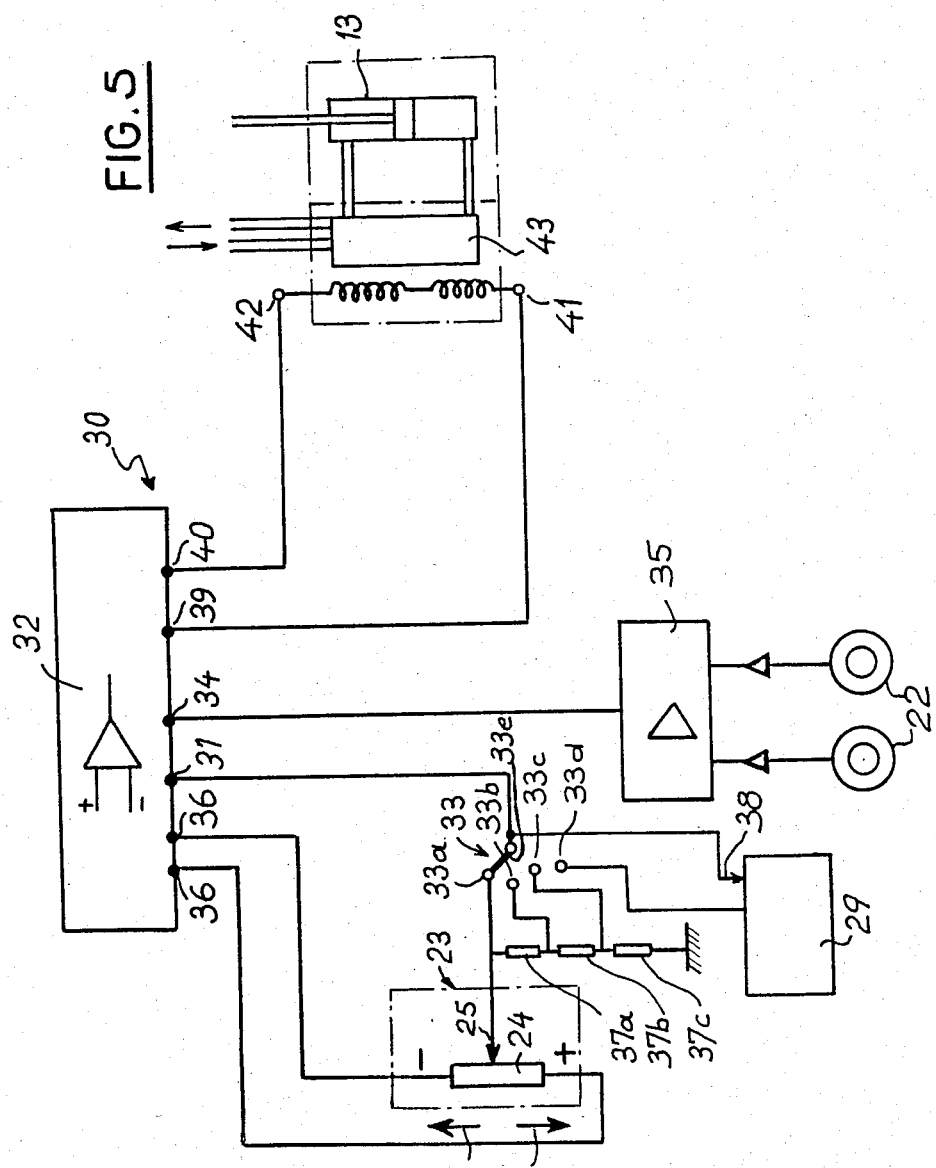
FIG. 5 is a simplified diagram of the servo-loop employed in the lathe shown in FIG. 1.

FIG. 5 represents a simplified diagram of the servo-loop 30 employed in the lathe according to the invention.

The generator 23 and the circuit 29 relating to the storage and the control are connected to the first input 31 of a differential amplifier 32 which may be of conventional design, through a switch 33 which selects the modes of operation. The second input 34 of the amplifier 32 is connected to a summing preamplifier 35 which is connected to the force sensors 22 (FIGS. 2 and 3). The potentiometer 24 is supplied with current from the terminals 36 of the amplifier 32 and its slider 25 is connected to a first fixed terminal 33a of the selector switch 33. The second and third terminals 33b and 33c of this selector switch are connected to the respective intermediate terminals of a voltage divider comprising three resistors 37a, 37b and 37c and adapted to determine the range of regulation of the force (rough, medium, fine) in the manual operating mode. The fourth fixed terminal 33d of the selector switch is connected to the output of the storage and control circuit 29.

The moving terminal 33e of the selecting switch is connected to the input 31 of the amplifier 32 and also to the storage input 38 of the circuit 29.

The power output 39, 40 of the amplifier 32 is connected to the control coils 41 and 42 of a controlled electrically-operated valve 43 through which valve the shifting device or cylinder device 13 is supplied with fluid with a rate of flow and a direction of flow of the fluid determined in accordance with the signals applied to the differential amplifier 32.

The lathe just described operates in the following manner:

At the start, the slide 26 is shifted toward the rear (toward the right in FIG. 4), the rod 27 being also in its withdrawn position without the spring 28 being capable of shifting it forwardly. The slide 25 thus remains for the moment in the rear position. Under these conditions, a maximum positive voltage is applied to the servo-loop and consequently the carriage 12 is in the withdrawn position thereof against mechanical abutments provided therefor (not shown).

After a form and a blank have been mounted on the lathe, it is sufficient to shift the slider 25 to the zero position (in shifting the slide 26 toward the left in FIG. 4) and then, in continuing this movement, the cylinder device 13 is supplied with fluid for shifting the carriage 12 forwardly. Indeed, under these conditions, as the roller 6 encounters no resistance to the transverse progression in the direction of the arrow b (FIG. 1), the sensors 22 do not yet deliver a signal and the amplifier 32 produces a difference signal whose value depends on the distance through which the slide 26 had been displaced, which value in fact determines the flow in the cylinder device 13 and consequently the speed of displacement of the roller 6 through the controlled valve 43.

As soon as the roller 6 encounters a resistance in coming into contact with the blank to be worked upon, there is produced a very slight deformation of the web of the yoke 20 which produces an instantaneous force or thrust signal on the output terminal of the summing amplifier 35, which signal is generated by the sensors 22. The latter deliver an information in pico-coulomb which is converted into a voltage which varies within a range of from 0 to 10 V, for example, at the output of the amplifier 35 as a function of the resistance encountered by the roller 6.

If the operator does not shift the slide 26, equilibrium in the servo-loop is reached when the thrust exerted by the roller corresponds to the chosen position of the slide 26.

On the other hand, if the operator moves the slide 26 forward still further, the loop is again in disequilibrium and the system searches a new state of equilibrium by an increased thrust of the roller 6 on the workpiece. It will be understood that, simultaneously, the operator may cause the roller 6 to move longitudinally in the direction of arrow a.

Thus it will be ovserved that, at each instant, the set signal commanded by the generator 23 is converted into a corresponding thrust of the roller on the workpiece to be formed, the work of the operator being facilitated by the fact that the generator 23 provides him by means of the spring 27 the sensation of effecting himself the thrust on the roller to within a considerable coefficient of amplification, of course. It must above all be noted that the measurement effected by the sensors 22 in no way takes into account all the disturbing forces which are produced in the region of the slide 11 of the carriage carrying the support 8, so that this measurement is of a very high precision.

The manual operation just described may be employed for one or more workpieces to be manufactued, but, in accordance with the invention, it is also possible to store all the set values produced inthe course of a given cycle of work in the storage and control circuit 29 so as to subsequently restore these values for a subsequent manufacture of identical workpieces.

It is for this reason that the circuit 29 is connected by its output to the terminal 33d of the selector switch 33 through which switch it may be connected to the set value input 31 of the differential amplifier 31. The storage and control circuit 29 may be constructed in various ways. For example and advantageously, it may be formed by a suitably programmed microprocessor so as to act on the servo-loop 30 and also advantageously for performing other functions of the lathe, such as for example controlling the longitudinal movement of the roller 6, controlling the lathe driving motor, actuating the tailstock, controlling certain parameters, etc.

In the course of the manual operation, the operator may choose several ranges of thrusts or forces ranging from 0 kg to a maximum thrust value. By way of example and merely for providing a better understanding of the invention, the first three positions of the selector switch 33 may correspond to the following regulating ranges:

terminal 33a: 0 to 2000 kg
terminal 33b: 0 to 1320 kg
terminal 33c: 0 to 666 kg

It must be understood that the invention is not intended to be limited in scope to the embodiment described hereinbefore. For example, a servo-loop similar to that employed for the transverse movement of the roller/may be employed for the longitudinal movement thereof. Moreover, for the programming of the automatic operation mode, it is possible to employ circuits having relays and potentiometers providing the amplifier 32 with set signals in a given order as a function of a pre-established program.

Thus it can be seen that, by means of the invention, the drawbacks of prior spinning and fluoturning devices are avoided and that the lathe according to the invention permits a very precise regulation and control of the force exerted by the roller 6 in operation in a plurality of ranges of regulation from zero force up to a maximum value determined in the selected range. Thus it is possible to carry out on the same machine rough forming and finishing operations on materials of very varied hardnesses, such as stainless steel, carbon steel, aluminium, etc . . . and also of very varied thicknesses.

Moreover, no mechanical pattern or master is required when the lathe is operating in the automatic mode.

Further, although a roller has been used for working on the workpieces in the foregoing description, those skilled in the art will understand that other tools, such as for example a "burnishing" tool, a ball or other tool, may be employed.

Having now described our invention, what we claim as new and desire to secure by Letters Patent is:

1. A spinning/fluoturning machine, comprising:
 a bed;
 a chuck;
 a device mounted on said bed for rotating said chuck about a horizontal axis;
 said chuck carrying a form having a contour corresponding to that of a workpiece which is to be produced;
 a carriage mounted relative to said bed to be movable in two directions which are mutually perpendicular;
 a support means for a spinning tool, comprising:
  a post rigid with said carriage, and
  a yoke member rotatably mounting said spinning tool;
 a first part of said yoke member being fixed to said post in a thrust-transmitting abutment relationship while allowing, in use, slight deformation of a second part of said yoke member by virtue of stresses imparted thereto by said spinning tool in the course of conducting a spinning/fluoturning operation;

sensor means fixed to said post so as to be responsive to said deformation of said second part of said yoke member;

means for shifting said carriage, comprising a shifting device connected to said carriage and including a control element for shifting said carriage by means of said shifting device in a respective one of said two directions which is substantially transverse to a mean generatrix of said chuck;

a servo-loop connected to said control element of said shifting device, comprising, as a generator of a real instantaneous signal, said sensor means; and a generator of a set value representing the force required to be exerted by said spinning tool on said workpiece, comprising means for dynamically varying said set value within the course of each working travel of said spinning tool, said sensor means and said set value generator being connected to comparing means for comparing the set value provided by said set value generator and the real instantaneous signal provided by said sensor means and for delivering a signal to said control element of said shifting device.

2. A machine according to claim 1, wherein said set value generator comprises a storage and control circuit for storing set values adapted to be selectively applied to said servo-loop.

3. A machine according to claim 1, wherein:

said post includes a substantially vertical branch and a horizontal branch;

said yoke includes a web for carrying said spinning tool;

said yoke is rigid with said horizontal branch solely by an edge portion of said web; and said sensor means is placed between said vertical branch of said post and a free part of said web other than said edge portion of said web.

4. A machine according to claim 1 or 3, wherein said set value generator comprises a continuously variable manual actuating device.

5. A machine according to claim 4, wherein said set value generator comprises a storage and control circuit for storing set values adapted to be selectively applied to said servo-loop, said machine further comprising a selector associated with means for applying to said servo-loop a plurality of ranges of set values.

6. A machine according to claim 5, wherein said selector comprises an additional position for selectively connecting the servo-loop to the manual actuating device and to the storage and control circuit, said storage and control circuit having a storage input connected to a set value input of said servo-loop for storing signals in the course of a cycle of manual operation of the machine.

7. A machine according to claim 4, wherein said manual actuating device comprises a potentiometer having a slider, a control element connected to move with the slider, and elastically yieldable means for biasing the control element to a zero position of regulation, said elastically yieldable means providing the machine operator a sensation of a force in the course of the manual control of the machine.

8. A machine according to claim 3 wherein said sensor means comprises two spaced apart sensors located symmetrically with respect to a generally vertical plane defined by said spinning tool.

9. A machine according to claim 8 wherein said servo-loop comprises a summing amplifier having two inputs, said sensors being respectively connected to said inputs.

* * * * *